July 5, 1938.   W. D. HARRIS   2,123,042

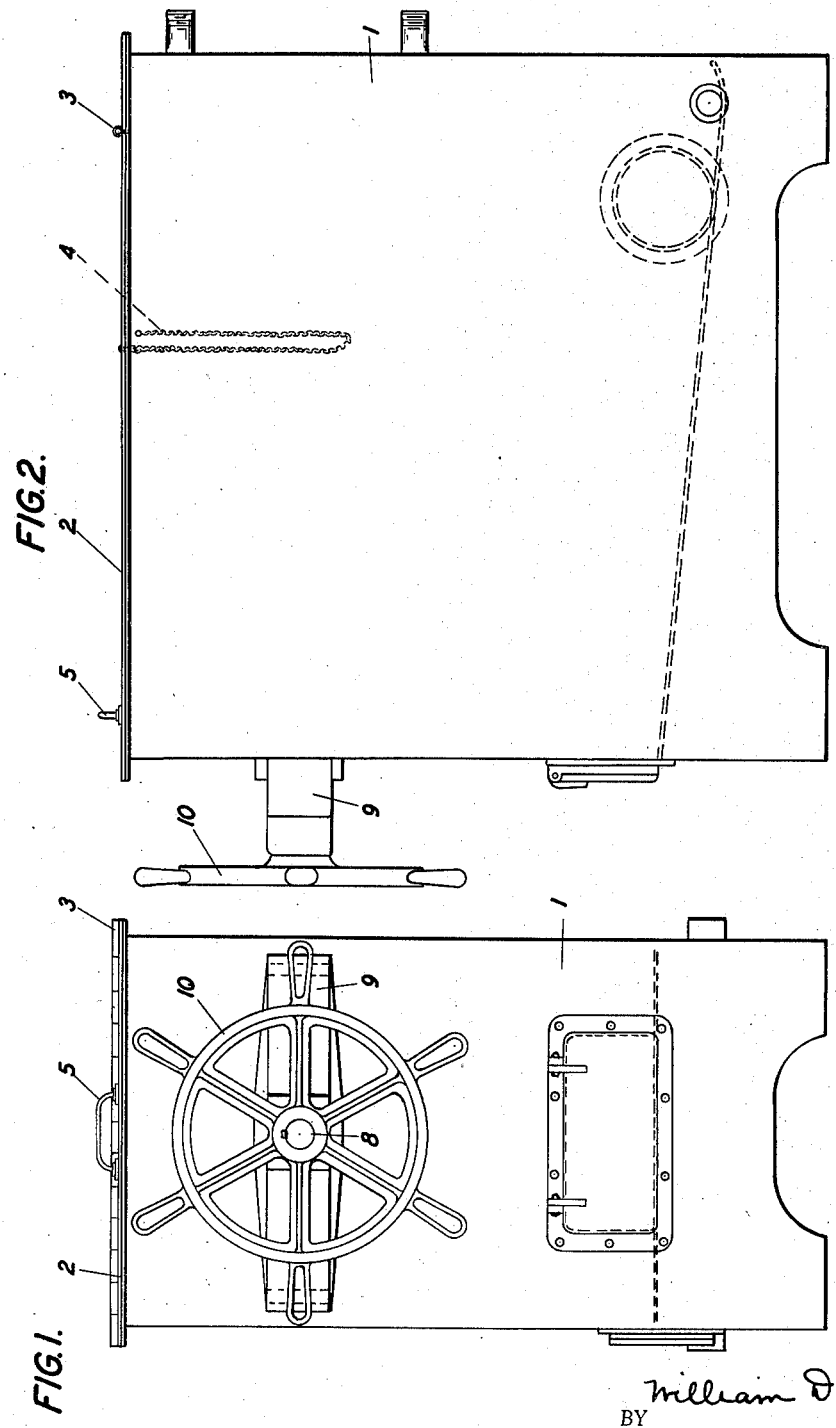

FILTER FABRIC FOR A PLATE AND FRAME FILTER PRESS FOR RE-REFINING USED OILS

Original Filed Feb. 6, 1935    4 Sheets-Sheet 2

INVENTOR.
William D. Harris
BY Harry Lea Dodson
ATTORNEY.

Patented July 5, 1938

2,123,042

UNITED STATES PATENT OFFICE 2,123,042

FILTER FABRIC FOR A PLATE AND FRAME FILTER PRESS FOR RE-REFINING USED OILS

William D. Harris, Kansas City, Mo., assignor to Refinoil Manufacturing Corporation, Kansas City, Mo.

Original application February 6, 1935, Serial No. 5,172. Divided and this application December 26, 1935, Serial No. 56,138

2 Claims. (Cl. 210—188)

My invention relates to the processes described in my copending application, Serial No. 5,172, of which this is a division. As described in that application the oil is first acid treated, then placed in a retort and the light ends and diluents vaporized in a vacuum. The oil is then drawn off and carried to a plate and frame filter press. These presses have been used for some time in the filtering of oil, to separate the purified oil from the adsorbent material used to restore color, etc. to the oil.

My invention has for its principal object to provide a fabric by the use of which all of the fines which now pass through the fabric employed will be separated out and a more perfect separation obtained.

A further object is to provide a fabric which will permit the operator, when the filtration has been completed, to lift the cake out without the least difficulty.

My means of attaining the foregoing objects may be more readily perceived by having reference to the accompanying drawings which are hereunto annexed and are a part of this specification, in which Fig. 1 is a side elevation more or less diagrammatic of apparatus for filtering used oils;

Fig. 2 is an end view of the same;

Similar reference numerals refer to similar parts throughout the entire description.

Figure 3:
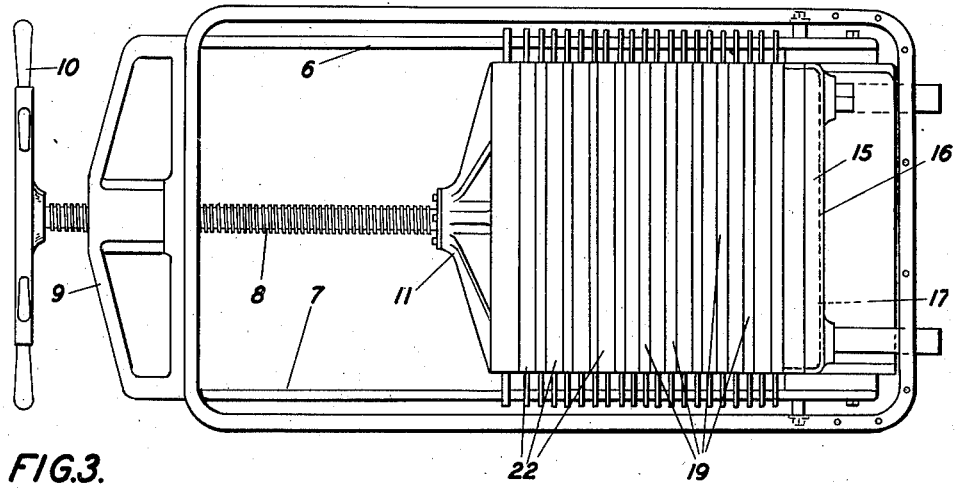
Fig. 3 is a plan view of the interior with the cover removed.
Figure 4:
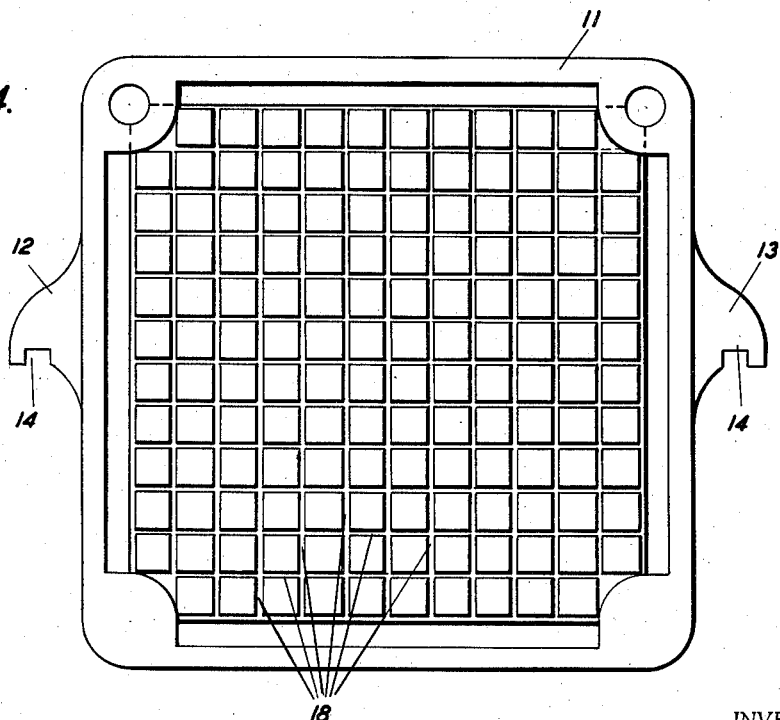
Fig. 4 is a detail view of an end pressure plate (M)
Figure 5:
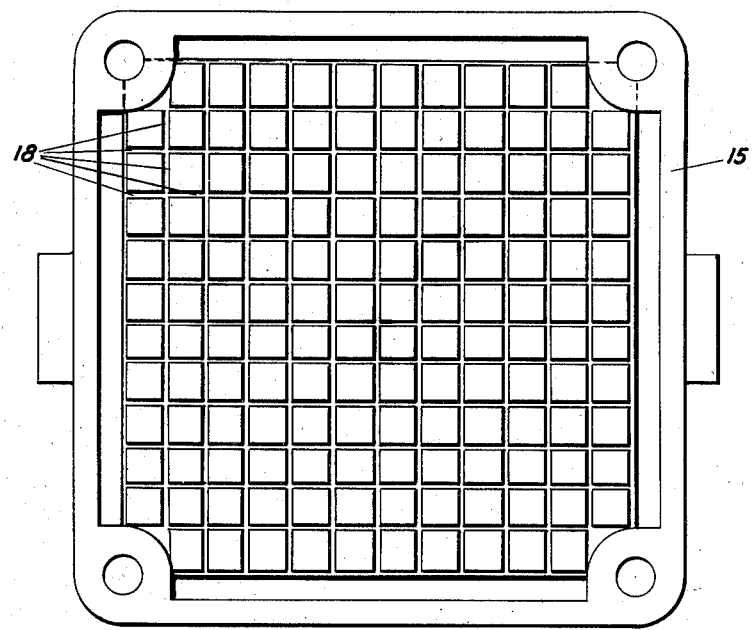
Fig. 5 is a similar view of the end header plate (N)
Figure 6:
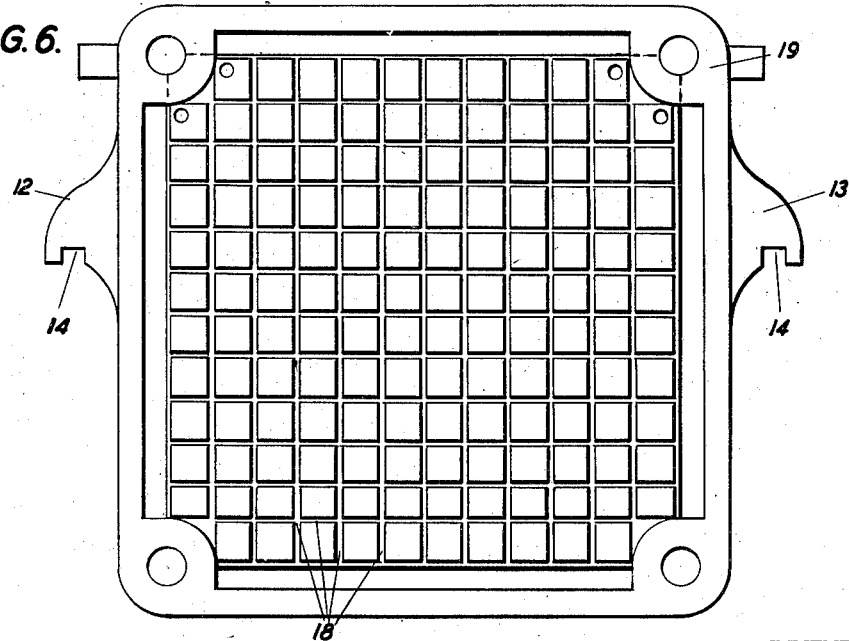
Fig. 6 is a detail view of one of the center plates (L)
Figure 7:
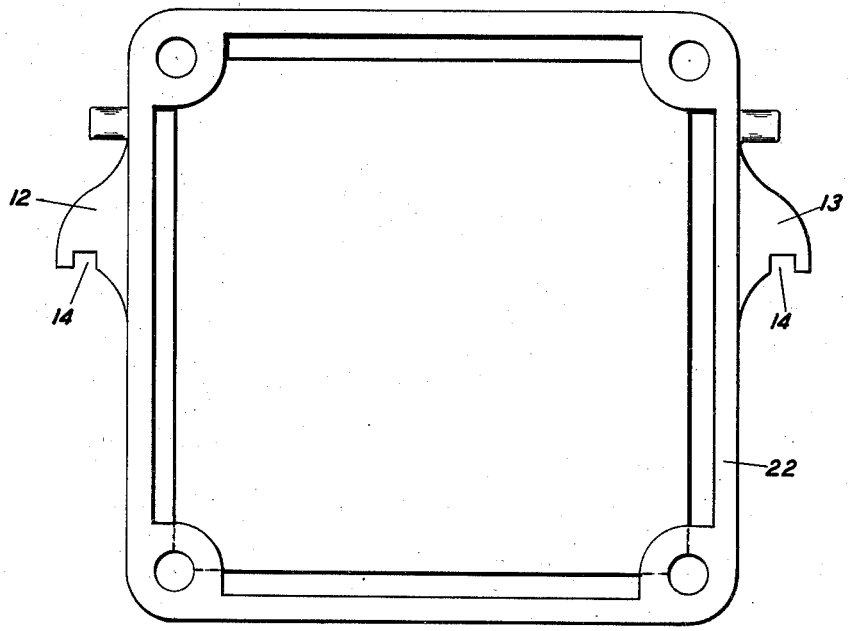
Fig. 7 is a similar view of a frame plate (K)
Figure 8:
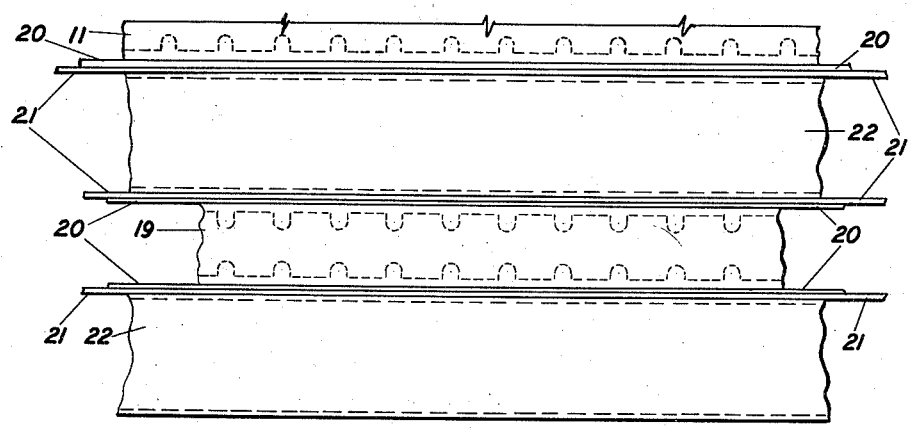
Fig. 8 is an enlarged fragmentary detail view showing the use of the filter fabric.

As shown in the drawings, the filter cabinet 1 is formed with end, side, and bottom walls. A cover or lid 2 is provided to close the top and is secured by a hinge 3. The lid is preferably reinforced with an angle iron which fits inside the front and side walls of the cabinet 1. A chain 4 may be provided to prevent the lid 2 or cover from dropping backwards. A suitable handle 5 is mounted adjacent the front of the cover 2. Guide bars 6 and 7 are secured inside the cabinet 1 upon which slidably rests the frames and plates. A pressure screw 8 is mounted in a header 9 which is preferably welded to the front wall of the cabinet 1. A hand wheel 10 is fixedly secured to the forward end of the screw 8. The inner end of said screw is rotatably attached to a front header pressure plate 11. This plate is provided with outwardly extending lugs 12 and 13, the lower face of each lug is provided with a slot 14 which is fitted to and slides upon the guide bars 6 and 7. A rear header plate 15 is mounted adjacent the rear wall of the cabinet 1 and is provided with oil receiving chambers 16 and 17 to which may be secured pipe connections to convey the filtered oil to any desired container (not shown). The inner faces of these header plates 11 and 15 are provided with a series of grooves 18 which extend vertically and horizontally through which the oil will pass after it is pressed through the filter fabric. Intermediate the two headers 11 and 15 are mounted a plurality of frame plates 22 and press plates 19. Intermediate each plate and frame I mount a filter fabric comprising a layer of canvas 20 which is next to the plate 11 or other suitable material, for example, and a layer of filter paper 21 which is next to the frame plate 22. In like manner I mount a layer of the paper 21 at the opposite side of the frame plate 22 and then a layer of canvas adjacent the press plate 19. The operation of the filter press is so well known to persons skilled in the art as to render a detailed description of the same unnecessary. My use of a combined filtering fabric of canvas and paper in a plate and frame press for filtering re-refined oil is novel and the results are highly beneficial for it not only filters out the fines which the canvas (used in standard practice) does not do but it also materially reduces the labor required in the operation for the paper enables the operator to remove the frames freely and the cakes formed by the residue will easily come out of the frames, the papers serving to maintain them in unbroken condition. This results in a substantial saving for labor while producing an unexcelled quantity of oil.

Having described my invention what I regard as new and desire to secure by Letters Patent is—

1. In a pressure filter for re-refined oils comprising alternate open frames and grooved plates, a filter medium comprising paper overlying textile filtering fabric interposed between said plates, said paper being directly exposed to the supply of oil to be filtered whereby the resultant cake may be removed readily in substantially unbroken condition together with said paper.

2. A pressure filter for re-refined oils comprising a plurality of pressure plates having grooved faces, interiorly unobstructed frame members disposed between adjacent pressure plates, a textile filtering material adjacent the faces of said pressure plates and a paper filtering material overlying said textile filtering material and contiguous to said frame members, said paper being thus directly exposed to the supply of oil to be filtered so that the resultant cake may be removed therewith.

WILLIAM D. HARRIS.